(12) United States Patent
Choi

(10) Patent No.: US 9,676,265 B2
(45) Date of Patent: Jun. 13, 2017

(54) HYBRID POWER TRAIN

(71) Applicant: Hyundai Motor Company, Seoul (KR)

(72) Inventor: Kum Lim Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/729,391

(22) Filed: Jun. 3, 2015

(65) Prior Publication Data
US 2016/0167502 A1 Jun. 16, 2016

(30) Foreign Application Priority Data
Dec. 16, 2014 (KR) .......................... 10-2014-0181779

(51) Int. Cl.
*B60K 6/365* (2007.10)
*F16H 3/00* (2006.01)
*B60K 6/38* (2007.10)
*F16H 3/093* (2006.01)

(52) U.S. Cl.
CPC ............... *B60K 6/365* (2013.01); *B60K 6/38* (2013.01); *F16H 3/006* (2013.01); *F16H 2003/0931* (2013.01); *F16H 2200/006* (2013.01); *Y10S 903/91* (2013.01); *Y10S 903/912* (2013.01)

(58) Field of Classification Search
CPC ..................................................... B60K 6/365
See application file for complete search history.

(56) References Cited

U.S. PATENT DOCUMENTS 5,697,466 A * 12/1997 Moroto ................. B60K 6/365
180/65.25
8,517,876 B2    8/2013 Sakai et al.
2004/0211604 A1* 10/2004 Heitmann .............. B60K 6/365
180/65.25
2012/0116629 A1*  5/2012 Kamoshida ............. B60K 6/36
701/22
2013/0150197 A1    6/2013 Lee et al.

FOREIGN PATENT DOCUMENTS

| JP | 2009-214640 A | 9/2009 | |
| JP | WO2010128542 A1 * | 11/2010 | ............ B60K 6/365 |
| JP | 2010-285012 A | 12/2010 | |
| KR | 2000-0012155 A | 3/2000 | |
| KR | 10-2006-0104203 A | 10/2006 | |
| KR | 10-2008-0022724 A | 3/2008 | |
| KR | 10-2013-0066225 A | 6/2013 | |

* cited by examiner

*Primary Examiner* — Tisha Lewis
(74) *Attorney, Agent, or Firm* — Morgan Lewis & Bockius LLP

(57) ABSTRACT

A hybrid power train may include a first friction element installed between an engine and a motor, a second friction element installed between the motor and the output shaft, and a planetary gear set including a plurality of rotating elements, in which the second friction element comprises a brake connected to any one rotating element of the planetary gear set.

14 Claims, 3 Drawing Sheets

HYBRID POWER TRAIN

CROSS-REFERENCE TO RELATED APPLICATION

The present application claims priority to Korean Patent Application No. 10-2014-0181779, filed Dec. 16, 2014, the entire contents of which is incorporated herein for all purposes by this reference.

BACKGROUND OF THE INVENTION

Field of the Invention

The present invention relates to a hybrid power train, and more particularly, to a hybrid power train capable of remarkably improving starting performance by disposing friction elements (clutch, brake, and the like) on both sides of a motor and remarkably reducing an overall length by a simple structure.

Description of Related Art

A hybrid vehicle means a vehicle which is driven by efficiently combining two kinds of different power sources, but in most cases, means a vehicle which is driven by an engine obtaining a torque by combusting fuel (fossil fuel such as gasoline) and an electric motor obtaining a torque by battery power.

The hybrid vehicle is a future vehicle which adopts an engine and an electric motor as an auxiliary power source to be able to reduce exhaust gas and enhance fuel efficiency and a study on the hybrid vehicle has been actively conducted to meet the demands of the times for enhancing fuel efficiency and developing environmentally-friendly products.

The hybrid vehicle generally uses an engine and a motor and uses the motor having relatively better low slow torque characteristics at a low speed as a main power source and the engine having relatively better high speed torque characteristics at a high speed as a main power source.

Therefore, the hybrid vehicle stops an operation of the engine which uses fossil fuel at a low speed section and uses the motor, and therefore has an excellent effect in improvement in fuel efficiency and a reduction in exhaust gas.

FIG. 1 is a diagram illustrating an example of a hybrid transmission according to the related art, in which an impulse clutch 3 is installed between an engine 1 and a motor 2 and a dual clutch 5 is installed between the motor 2 and an output shaft 4.

By this configuration, the hybrid transmission according to the related art may have excellent engine starting performance while a vehicle is driven by the impulse clutch 3 and prevent a starting shock by a slip action of the dual clutch 5 when the starting shock occurring at the time of the engine starting is delivered to the output shaft 4.

However, since the hybrid transmission according to the related art includes the impulse clutch 3, the overall length may be increased.

FIG. 2 is a diagram illustrating another example of a hybrid transmission according to the related art, in which a dual clutch 15 is installed between an engine 11 and a motor 12 and the motor 12 is directly connected to the output shaft 14.

By this configuration, the motor 12 is directly connected to the output shaft 14 and therefore the overall length may be short. However, the starting shock occurring at the time of the starting of the engine 11 may not be prevented from being delivered to the output shaft 14 by the direct connection between the motor 12 and the output shaft 14 and the starting time may be long.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hybrid power train capable of remarkably improving starting performance by disposing friction elements on both sides of a motor, respectively, and remarkably reducing an overall length by a compact structure.

According to various aspects of the present invention, a hybrid power train may include a first friction element installed between an engine and a motor, a second friction element installed between the motor and the output shaft, and a planetary gear set including a plurality of rotating elements, in which the second friction element may include a brake connected to any one rotating element of the planetary gear set.

The planetary gear set may be installed at an inner diameter side of the motor.

The brake may be configured to selectively perform a coupling operation, a releasing operation, and a slip operation.

The first friction element may include a dual clutch.

According to various aspects of the present invention, a hybrid power train may include an input shaft connected to an engine, a first friction element installed in the middle of the input shaft, a motor installed in a transmission housing, a planetary gear set including a plurality of rotating elements, and a second friction element installed between the motor and the output shaft, in which the second friction element includes a brake connected to any one rotating element of the planetary gear set.

The dual clutch may be installed at one side of the input shaft.

The planetary gear set may include a sun gear, a carrier, and a ring gear and the second friction element may be a brake which is installed between the sun gear of the planetary gear set and the transmission housing.

The motor may be connected to the input shaft through the carrier of the planetary gear set.

The ring gear of the planetary gear set may be connected to an input gear and the input gear may be meshed with an output gear.

The output gear may be installed at an intermediate shaft and the intermediate shaft may be disposed to be parallel with the output shaft.

A speed synchronization mechanism may be installed at one side of the intermediate shaft, adjacent to the output gear.

The speed synchronization mechanism may be a synchronizer.

The speed synchronization mechanism may be a dog clutch.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
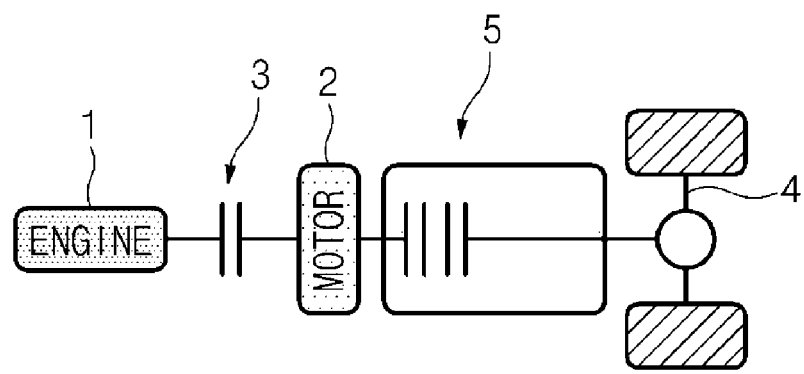
FIG. 1 is a configuration diagram illustrating a hybrid power train according to the related art.
Figure 2:
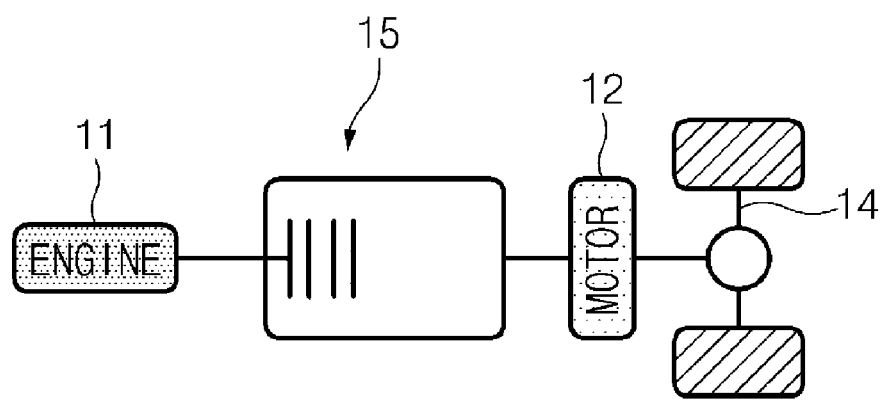
FIG. 2 is a configuration diagram illustrating another example of a hybrid power train according to the related art.
Figure 3:
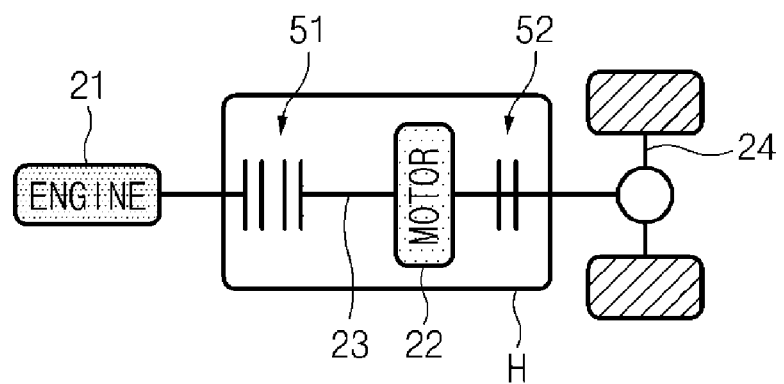
FIG. 3 is a configuration diagram schematically illustrating an exemplary hybrid power train according to the present invention.
Figure 4:
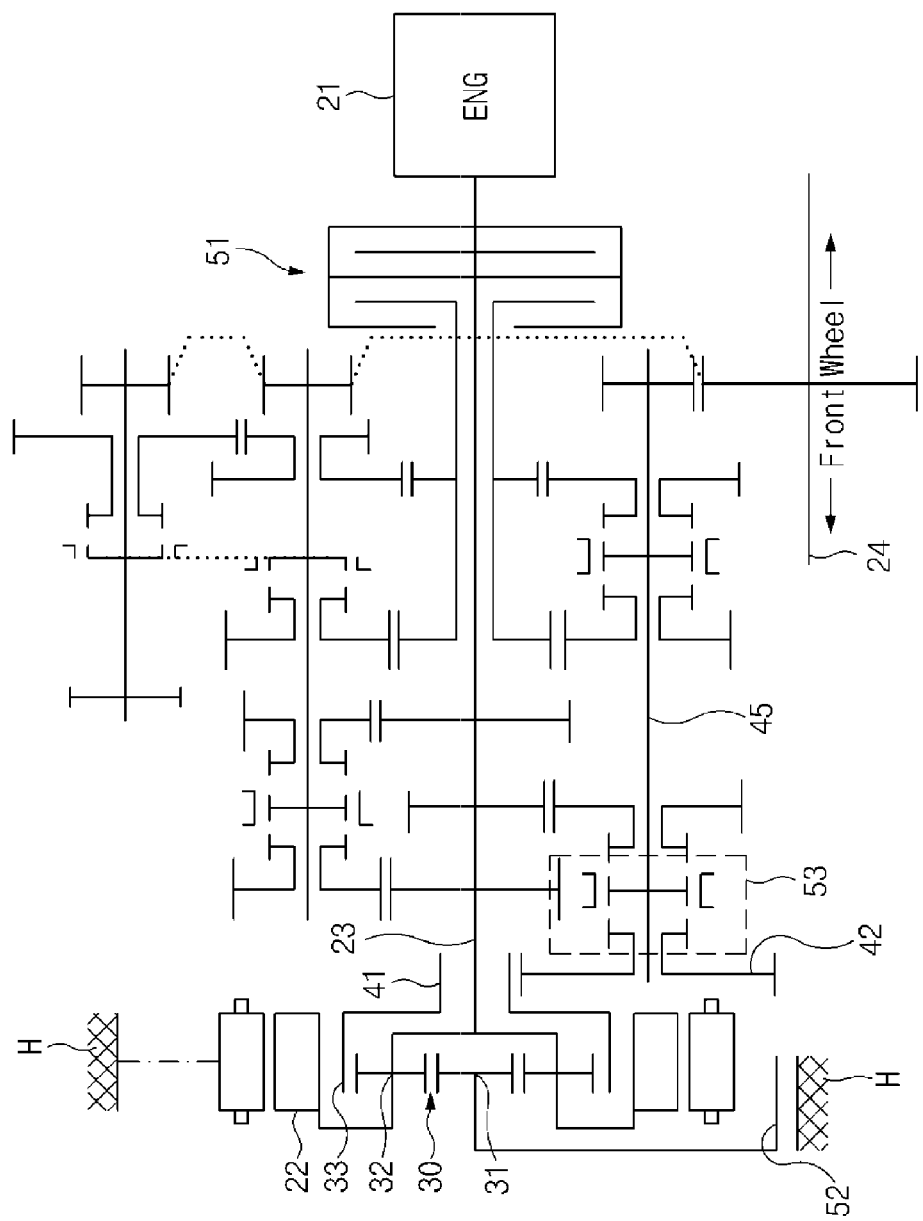
FIG. 4 is a diagram illustrating the exemplary hybrid power train according to the present invention.

FIGS. 3 and 4 are diagrams illustrating a hybrid power train according to various embodiments of the present invention.

As illustrated in FIG. 3, in the hybrid power train according to various embodiments of the present invention, an engine 21 is connected to an input shaft 23, a first friction element 51 is installed between the engine 21 and a motor 22, and a second friction element 52 is installed between the motor 22 and an output shaft 24. Further, the first friction element 51 and the second friction element 52 are installed at both sides of the motor 22.

As described above, the first and second friction elements 51 and 52 may be individually installed at both sides of the motor 22 to surely prevent a starting shock from being delivered to the output shaft, thereby remarkably improving the starting performance.

As illustrated in FIG. 4, the hybrid power train according to various embodiments of the present invention includes the input shaft 23 connected to the engine 21, the first friction element 51 installed in the middle of the input shaft 23, the motor 22 installed in a transmission housing H, a planetary gear set 30 installed at an inner diameter of the motor 22, and the second friction element 52 installed between the motor 22 and the output shaft 24.

The input shaft 23 is long installed in the transmission housing H and the input shaft 23 is configured to have one side connected to the engine 21 to receive a rotation power of the engine 21.

The first friction element 51 is installed in the middle of the input shaft 23 and the first friction element 51 is configured as a dual clutch.

The motor 22 includes a stator which is installed in the transmission housing H and a rotor which is rotatably installed at an inner diameter of the stator. At the time of EV driving, a rotation power of the motor 22 is configured to be delivered to the output shaft 24 through an intermediate shaft 45 and at the time of a starting mode, the rotation power of the motor 22 is configured to be delivered to the engine 21 through the input shaft 23.

The planetary gear set 30 is configured as a plurality of rotation elements as a single pinion planetary gear set which is installed at the inner diameter (or outer diameter) of the motor 22. The planetary gear set 30 is configured as a combination of a sun gear 31, a carrier 32 meshed with the sun gear 31, and a ring gear 33 meshed with the carrier 32.

Further, one side of the carrier 32 is connected to the rotor of the motor 22 and the other side of the carrier 32 is connected to the input shaft 23. Therefore, the motor 22 and the input shaft 23 are connected to each other through the carrier 32 of the planetary gear set 30, thereby effectively delivering the rotation power of the motor to the engine 21 side when the engine 21 starts.

Further, according to various embodiments of the present invention, the planetary gear set 30 may be installed at the inner diameter (or outer diameter) side of the motor 22 to implement a more compact structure, thereby remarkably reducing the overall length.

The second friction element 52 may be configured as the brake which is connected to any one rotation element of the planetary gear set 30.

According to various embodiments of the present invention, the second friction element 52 is configured as the brake which is installed between the sun gear 31 of the planetary gear set 30 and the transmission housing H, in which the brake is configured to selectively perform a coupling operation, a releasing operation, and a slip operation.

As described above, the starting shock may be surely prevented from being delivered to the output shaft by the slip operation of the second friction element 52 configured as the brake, thereby remarkably improving the starting performance.

In particular, according to the various embodiments of the present invention, instead of the impulse clutch according to the related art, the second friction element 52 configured as the brake may be installed to very compactly implement the overall structure, thereby remarkably saving the costs and facilitating the control.

The ring gear 33 of the planetary gear set 30 is connected to an input gear 41. The input gear 41 is configured as a hollow gear body including a hollow part provided therein and the input shaft 23 is installed to penetrate through the hollow part of the input gear 41, such that the input gear 41 may freely rotate without interfering and hindering with and from the input shaft 23.

The input gear 41 is meshed with the output gear 42 with externally contacting therewith, the output gear 42 is installed in the middle of the intermediate shaft 45, the intermediate shaft 45 is disposed in parallel with the input shaft 23 and the output shaft 24, and the intermediate shaft 45 is connected to the output shaft 25 through a final gear, and the like.

One side of the intermediate shaft 45 is provided with a speed synchronization mechanism 53 and the speed synchronization mechanism 53 is installed to be adjacent to the output gear 42.

According to various embodiments of the present invention, the speed synchronization mechanism 53 is configured as a dog clutch which is installed at one side of the intermediate shaft 45.

According to various embodiments of the present invention, the speed synchronization mechanism 53 is configured as a synchronizer which is installed at one side of the intermediate shaft 45.

An operation relationship of the hybrid power train according to various embodiments of the present invention configured as described above will be described as follows.

In the EV driving of the hybrid power train, when the brake which is the second friction element 52 is coupled in the state in which the dual clutch which is the first friction element 51 is released, the power of the motor 22 is delivered to the input gear 41 and the output gear 42 through the carrier 32 and the ring gear 33 of the planetary gear set 30 and when the output gear 42 is selectively connected by the speed synchronization mechanism 53 of the intermediate shaft 45, the power of the motor 22 is delivered to the output shaft 24 through the intermediate shaft 43 to perform the EV driving.

Further, when the dual clutch which is the first friction element 51 is coupled, the power of the motor 22 is delivered to the carrier 22 and then is delivered to the engine 21 through the input shaft 23 which is connected to the other side of the carrier 22, thereby starting the engine 21. As the brake which is the second friction element 52 is slipped when the engine 21 starts, the starting shock occurring when the engine 21 starts is sufficiently absorbed in the second friction element 52 and thus is blocked from being delivered to the output shaft 24, thereby remarkably improving the starting performance.

As described above, according to various embodiments of the present invention, the first and second friction elements may be individually installed at both sides of the motor and thus the second friction element configured as the brake may surely prevent the starting shock from being delivered to the output shaft, thereby remarkably improving the starting performance.

In particular, according to various embodiments of the present invention, instead of the impulse clutch according to the related art, the second friction element configured as the brake may be installed to very compactly implement the overall structure, thereby remarkably saving the costs and facilitating the control.

Further, according to various embodiments of the present invention, the planetary gear set may be installed at the inner diameter (or outer diameter) side of the motor to implement the compact structure, thereby remarkably reducing the overall length.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hybrid power train, comprising:
a first friction element installed between an engine and a motor;
a second friction element installed between the motor and an output shaft; and
a planetary gear set including a plurality of rotating elements,
wherein the second friction element comprises a brake connected to a rotating element of the planetary gear set,
wherein the planetary gear set includes a sun gear, a carrier, and a ring gear and the second friction element is a brake which is installed between the sun gear of the planetary gear set and a transmission housing, and
wherein the motor is connected to an input shaft through the carrier of the planetary gear set.

2. The hybrid power train according to claim 1, wherein the planetary gear set is installed at an inner diameter side of the motor.

3. The hybrid power train according to claim 1, wherein the brake is configured to selectively perform a coupling operation, a releasing operation, and a slip operation.

4. The hybrid power train according to claim 1, wherein the first friction element comprises a dual clutch.

5. A hybrid power train, comprising:
an input shaft connected to an engine;
a first friction element installed in a middle of the input shaft;
a motor installed in a transmission housing;
a planetary gear set including a plurality of rotating elements; and
a second friction element installed between the motor and an output shaft,
wherein the second friction element comprises a brake connected to a rotating element of the planetary gear set,
wherein the planetary gear set includes a sun gear, a carrier, and a ring gear and the second friction element is a brake which is installed between the sun gear of the planetary gear set and the transmission housing, and
wherein the motor is connected to the input shaft through the carrier of the planetary gear set.

6. The hybrid power train according to claim 5, wherein the planetary gear set is installed at an inner diameter side of the motor.

7. The hybrid power train according to claim 5, wherein the brake is configured to selectively perform a coupling operation, a releasing operation, and a slip operation.

8. The hybrid power train according to claim 5, wherein the first friction element comprises a dual clutch.

9. The hybrid power train according to claim 8, wherein the dual clutch is installed at one side of the input shaft.

10. The hybrid power train according to claim 5, wherein the ring gear of the planetary gear set is connected to an input gear and the input gear is meshed with an output gear.

11. The hybrid power train according to claim 10, wherein the output gear is installed at an intermediate shaft and the intermediate shaft is disposed to be parallel with the output shaft.

12. The hybrid power train according to claim 10, wherein a speed synchronization mechanism is installed at one side of the intermediate shaft, and adjacent to the output gear.

13. The hybrid power train according to claim 12, wherein the speed synchronization mechanism comprises a synchronizer.

14. The hybrid power train according to claim 12, wherein the speed synchronization mechanism comprises a dog clutch.

* * * * *